United States Patent
Ameling et al.

(10) Patent No.: US 11,962,434 B2
(45) Date of Patent: Apr. 16, 2024

(54) METHODS, SYSTEMS, AND COMPUTER READABLE MEDIA FOR CAPTURING DROPPED PACKETS AT A SWITCHING FABRIC EMULATOR

(71) Applicant: Keysight Technologies, Inc., Santa Rosa, CA (US)

(72) Inventors: Thomas Ameling, Woodland Hills, CA (US); Razvan Ionut Stan, Agoura Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/860,932

(22) Filed: Jul. 8, 2022

(65) Prior Publication Data

US 2024/0015051 A1 Jan. 11, 2024

(51) Int. Cl.
*H04L 12/54* (2022.01)
*H04L 12/46* (2006.01)
*H04L 12/70* (2013.01)

(52) U.S. Cl.
CPC ...... *H04L 12/5601* (2013.01); *H04L 12/4633* (2013.01); *H04L 12/4641* (2013.01); *H04L 2012/5628* (2013.01); *H04L 2012/5647* (2013.01); *H04L 2012/5681* (2013.01)

(58) Field of Classification Search
None
See application file for complete search history.

(56) References Cited

U.S. PATENT DOCUMENTS

| | | |
|---|---|---|
| 8,537,839 B2 | 9/2013 | Gintis et al. |
| 8,761,187 B2 | 6/2014 | Barde |
| 8,898,333 B1 | 11/2014 | White et al. |
| 9,219,667 B2 | 12/2015 | Badea et al. |
| 9,590,909 B2 | 3/2017 | Mogul et al. |
| 9,800,508 B2 | 10/2017 | Janardhanan |
| 9,819,551 B2 | 11/2017 | Forster et al. |
| 9,843,525 B2 | 12/2017 | Beecroft et al. |
| 9,860,152 B2 | 1/2018 | Xia et al. |
| 9,898,317 B2 | 2/2018 | Nakil et al. |

(Continued)

OTHER PUBLICATIONS

Andersen, et al., "Parallel Data Lab", Carnegie Melon, https://www.pdl.cmu.edu/Incast/, n.d., (retrieved Aug. 2023).

(Continued)

*Primary Examiner* — Younes Naji (57) ABSTRACT

One example method occurs at a switching fabric emulator providing an emulated switching fabric comprising emulated switching elements and associated packet queues, wherein the switching fabric emulator comprises at least one switching application-specific integrated circuit (ASIC) or programmable switching chip, the method comprising: during a test session: receiving, via at least a first physical port of the switching fabric emulator, packets from or to a system under test (SUT); detecting an occurrence of a dropped packet that happens while the packet is traversing the emulated switching fabric; encapsulating dropped packet data associated with the dropped packet, wherein the encapsulated dropped packet data indicates an emulated switching element or packet queue contributing to the occurrence of the dropped packet; and providing the encapsulated dropped packet data to an analyzer.

16 Claims, 6 Drawing Sheets

(56) References Cited

U.S. PATENT DOCUMENTS

| | | | |
|---|---|---|---|
| 10,579,408 | B2 | 3/2020 | Wang et al. |
| 10,581,715 | B1* | 3/2020 | Thompson .......... H04L 41/5019 |
| 10,608,939 | B1* | 3/2020 | Kim .................. H04L 43/062 |
| 11,258,719 | B1 | 2/2022 | Sommers |
| 11,483,228 | B2 | 10/2022 | Liu et al. |
| 11,621,908 | B2 | 4/2023 | Liu et al. |
| 2001/0055274 | A1 | 12/2001 | Hegge et al. |
| 2011/0125517 | A1* | 5/2011 | Dhoble ................ G16H 10/60 705/2 |
| 2014/0047125 | A1 | 2/2014 | Hyoudou et al. |
| 2014/0258781 | A1 | 9/2014 | Cook |
| 2015/0317169 | A1 | 11/2015 | Sinha et al. |
| 2017/0353531 | A1 | 12/2017 | Conn |
| 2019/0036802 | A1* | 1/2019 | Kuttuva Jeyaram ....................... H04L 41/145 |
| 2019/0354406 | A1 | 11/2019 | Ganguli et al. |
| 2019/0372873 | A1* | 12/2019 | Beeram ................ H04L 47/32 |
| 2019/0386924 | A1 | 12/2019 | Srinivasan et al. |
| 2020/0067792 | A1 | 2/2020 | Aktas et al. |
| 2020/0112487 | A1 | 4/2020 | Inamdar et al. |
| 2020/0112524 | A1 | 4/2020 | Sindhu et al. |
| 2020/0120029 | A1 | 4/2020 | Sankaran et al. |
| 2020/0195519 | A1 | 6/2020 | Di Martino |
| 2020/0313999 | A1 | 10/2020 | Lee et al. |
| 2020/0326971 | A1 | 10/2020 | Yang |
| 2020/0366608 | A1 | 11/2020 | Pan et al. |
| 2021/0112002 | A1 | 4/2021 | Pan et al. |
| 2022/0014457 | A1 | 1/2022 | Liu et al. |
| 2022/0052970 | A1* | 2/2022 | Radi .................. H04L 45/24 |
| 2022/0060422 | A1 | 2/2022 | Sommers |
| 2022/0116303 | A1 | 4/2022 | Sommers et al. |
| 2022/0247661 | A1 | 8/2022 | Liu et al. |
| 2023/0146525 | A1* | 5/2023 | Ball .................... H04L 41/0895 370/392 |
| 2023/0198676 | A1* | 6/2023 | K N ..................... H04L 1/1809 370/236 |

OTHER PUBLICATIONS

Notice of Allowance and Fee(s) Due for U.S. Appl. No. 17/162,620 (dated Jun. 23, 2022).

"Systems and Methods For Testing and Analyzing TCP Behavior in a Datacenter", IP.COM Pub. Id. IPCOM000270660D (Aug. 2022).

Alizadeh et al., "Data Center TCP (DCTCP)," SIGCOMM '10, pp. 1-12 (Aug. 30-Sep. 3, 2010).

Grochla, "Simulation comparison of active queue management algorithms in TCP/IP networks," Telecommunication Systems, pp. 1-9 (Oct. 2008).

Barak, "Introduction to Remote Direct Memory Access (ROMA)," http://www.rdmamojo.com/2014/03/31/remote-direct-memory-access-rdma/, pp. 1-14 (Mar. 31, 2014).

"Quick Concepts Part 1—Introduction to ROMA," ZCopy, Education and Sample Code for RDMA Programming, pp. 1-5 (Oct. 8, 2010).

Zhu et al., "Congestion Control for Large-Scale RDMA Deployments," SIGCOMM '15, pp. 1-14 (Aug. 17-21, 2015).

Zhu et al., "Packet-Level Telemetry in Large Datacenter Networks," SIGCOMM '15, pp. 1-13 (Aug. 17-21, 2015).

Mittal et al., "TIMELY: RTT-based Congestion Control for the Datacenter," SIGCOMM '15, pp. 1-14 (Aug. 17-21, 2015).

"ROCE in the Data Center," Mellanox Technologies, White Paper, pp. 1-3 (Oct. 2014).

Kim et al., "In-band Network Telemetry (INT)," pp. 1-28 (Jun. 2016).

Zhu et al., "ECN or Delay: Lessons Learnt from Analysis of DCQCN and TIMELY," CoNEXT '16, pp. 1-15 (Dec. 12-15, 2016).

Varadhan et al., "Validating ROCEV2 in the Cloud Datacenter," OpenFabrics Alliance, 13th Annual Workshop 2017, pp. 1-17 (Mar. 31, 2017).

Mittal et al., "Revisiting Network Support for RDMA," SIGCOMM '18, pp. 1-14 (Aug. 20-25, 2018).

"Understanding RoCEv2 Congestion Management," Mellanox, https://community.mellanox.com/s/article/understanding-rocev2-congestion-management, pp. 1-6 (Dec. 3, 2018).

"Data Center Quantized Congestion Notification (DCQCN)," Juniper Networks, pp. 1-7 (Oct. 4, 2018).

"Understanding DC-QCN Algorithm for RoCE Congestion Control," Mellanox, pp. 1-4 (Dec. 5, 2018).

Geng et al., "P4QCN: Congestion Control Using P4-Capable Device in Data Center Networks," Electronics, vol. 8, No. 280, pp. 1-17 (Mar. 2, 2019).

Mandal, "In-band Network Telemetry—More Insight into the Network," Ixia, https://www.ixiacom.com/company/blog/band-network-telemetry-more-insight-network, pp. 1-9 (Mar. 1, 2019).

"What is RDMA?," Mellanox, pp. 1-3 (Apr. 7, 2019).

"RoCE Congestion Control Interoperability Perception vs. Reality," Broadcom White Paper, pp. 1-8 (Jul. 23, 2019).

Even et al, "Data Center Fast Congestion Management," pp. 1-15 (Oct. 23, 2019).

Li et al., "HPCC: High Precision Congestion Control," SIGCOMM '19, pp. 1-15 (Aug. 19-23, 2019).

Chen et al., "Data Center Congestion Management requirements," https://tools.ietf.org/id/draft-yueven-tsvwg-dcom-requirements-01.html, pp. 1-7 (Jul. 2019).

"H3C S6850 Series Data Center Switches," New H3C Technologies Co., Limited, pp. 1-13 (Mar. 2020).

"Traffic Management User Guide (QFX Series and EX4600 Switches)," Juniper Networks, pp. 1-1121 (Mar. 18, 2020).

Byagowi et al., "Bringing the F16 Network into the Lab," Open Platinum, pp. 1-16 (2020).

Liu et al., "HPCC++: Enhanced High Precision Congestion Control," Network Working Group, pp. 1-15 (Jun. 17, 2020).

Beltman et al., "Collecting telemetry data using P4 and RDMA," University of Amsterdam, pp. 1-12 (2020).

Non-Final Office Action for U.S. Appl. No. 17/001,614 (dated Apr. 23, 2021).

Notice of Allowance and Fee(s) Due for U.S. Appl. No. 17/001,614 (dated Sep. 29, 2021).

Notice of Allowance and Fee(s) Due for U.S. Appl. No. 17/319,872 (dated Nov. 25, 2022).

Non-Final Office Action for U.S. Appl. No. 17/319,872 (dated Aug. 2, 2022).

Commonly-Assigned, co-pending U.S. Appl. No. 18/107,363 for "Methods, Systems and Computer Readable Media for Non-Intrusive Queue Analysis" (Unpublished, filed Feb. 8, 2023).

* cited by examiner

METHODS, SYSTEMS, AND COMPUTER READABLE MEDIA FOR CAPTURING DROPPED PACKETS AT A SWITCHING FABRIC EMULATOR

TECHNICAL FIELD

The subject matter described herein relates to network testing. More specifically, the subject matter relates to methods, systems, and computer readable media for capturing dropped packets at a switching fabric emulator.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical central processing unit (CPU)-based server or node in the data center. In this example, each VM may execute an operating system and other software, where each VM may appear as a physical server to end users.

When testing data center equipment, it is important to make sure that testing mimics real world scenarios and conditions. For example, when testing a data center server or related applications, it may be necessary to mimic or emulate a switching fabric or other resources in the data center and to emulate or approximate various test scenarios or related processing states, e.g., by using test traffic and/or effecting various processing scenarios.

SUMMARY

Methods, systems, and computer readable media for capturing dropped packets at a switching fabric emulator are disclosed. One example method occurs at a switching fabric emulator providing an emulated switching fabric comprising emulated switching elements and associated packet queues, wherein the switching fabric emulator comprises at least one switching application-specific integrated circuit (ASIC) or programmable switching chip, the method comprising: during a test session: receiving, via at least a first physical port of the switching fabric emulator, packets from or to a system under test (SUT); detecting an occurrence of a dropped packet that happens while the packet is traversing the emulated switching fabric; encapsulating dropped packet data associated with the dropped packet, wherein the encapsulated dropped packet data indicates an emulated switching element or packet queue contributing to the occurrence of the dropped packet; and providing the encapsulated dropped packet data to an analyzer.

According to one example system, the system includes a switching fabric emulator providing an emulated switching fabric comprising emulated switching elements and associated packet queues comprising at least one ASIC or programmable switching chip; and a memory. The switching fabric emulator is configured for: during a test session: receiving, via at least a first physical port of the switching fabric emulator, packets from or to a SUT; detecting an occurrence of a dropped packet that happens while the packet is traversing the emulated switching fabric; encapsulating dropped packet data associated with the dropped packet, wherein the encapsulated dropped packet data indicates an emulated switching element or packet queue contributing to the occurrence of the dropped packet; and providing the encapsulated dropped packet data to an analyzer.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for capturing dropped packets at a switching fabric emulator. Various test environments may generate and use test traffic for background test traffic or other purposes, e.g., to emulate or approximate realistic network scenarios and/or processing scenarios. As such, a test system that can capture and analyze dropped packet data associated with an emulated switching fabric can be useful in testing how a network product or service performs at scale in a particular switching fabric environment (e.g., a data center environment) and/or for testing how a network product or service will impact the performance of a particular switching fabric environment or a device associated with that particular switching fabric environment.

In accordance with some aspects of the subject matter described herein, a test system can generate (e.g., via internal or external test packet generators) and inject various types of test traffic during testing of a system under test (SUT) (e.g., one or more devices or a network). For example, an example test system in accordance with some aspects described herein may be configured for testing a SUT by sending test traffic to the SUT and/or responding to SUT-generated traffic. In this example, the test system may inject test traffic for testing the SUT and may also inject synthetic background test traffic into a real (e.g., non-emulated) or an emulated switching fabric such that the test traffic along with the background test traffic traverses the switching fabric toward at least one destination accessible via the switching fabric. In another example, an example test system in accordance with some aspects described herein may be configured to generate and send, via a switching fabric, background test packets (e.g., test related packets that may not be processed by a SUT but may be used to represent other traffic traversing a network or a switching fabric during a test session (e.g., for emulating congestion or high traffic load scenarios)) to a packet destination (e.g., an emulated host with a unique IP address) associated with the test system.

In accordance with some aspects of the subject matter described herein, an emulated switch is distinctly different from an entity referred to commonly in the industry as a virtual switch. More particularly, a virtual switch (vSwitch) is a software application that runs on top of a CPU, which allows communication between virtual machines, where the virtual machines are administered by a virtual machine hypervisor. A vSwitch does not subdivide and allocate resources of an underlying physical switch (e.g., an application-specific integrated circuit (ASIC) chip, a P4 programmable chip, or a Tofino chip) into multiple emulated switches, but instead creates a software representation of a completely virtual switch and there is no mapping to underlying physical switching ASIC or chip hardware resources.

In accordance with some aspects of the subject matter described herein, a test system (e.g., one or more computing platforms, devices, or nodes) may be configured to emulate a switching fabric environment (e.g., a data center environment), such as virtual networking resources and/or other switching fabric related resources. In accordance with some aspects of the subject matter described herein, a switching fabric emulator may be implemented using one or more network emulation platforms (NEPs) (e.g., chassis or nodes with one or more physical switching application-specific integrated circuit (ASIC) resources usable for emulating a number of switches connected via various topologies). It will be appreciated that some embodiments include one or more emulated switches, where an emulated switch is a logically allocated portion of a physical switching ASIC of a NEP that appears as an independent logical switch device to the environment (e.g., a DUT, SUT, or controller) by using a NEP resource allocator (NEPRA) and/or a switching ASIC resource allocator (SARA). In some embodiments, the NEPRA and/or SARA may be configured to facilitate collection and reporting of emulated logical switch performance metric information (e.g., emulated logical switch packet queue depth, emulated logical switch latency, etc.) during a test run or session by a visibility module.

In accordance with some aspects of the subject matter described herein, during testing (with or without using background traffic), traffic can be lost or discarded depending on various factors, including test configurations and/or switching fabric configurations. For example, a test system may configure and use an emulated switching fabric where there are insufficient links or bandwidth between tiers (e.g., where two hosts in a top of rack (ToR) emulated switch communicate with two other hosts in another ToR emulated switch, and the ToR emulated switches are connected through an intermediary emulated switch (e.g., a pod emulated switch) but there are insufficient links or bandwidth between the ToR virtual switch and the intermediary emulated switch). In this example, during testing, one or more packets may drop when they are transmitted to or from the emulated switches or while they are in the emulated switching fabric.

In accordance with some aspects of the subject matter described herein, a test system can configure a switching fabric emulator to capture dropped packets or related data. For example, a switching fabric emulator may be configured (e.g., by a test operator or controller) to forward dropped ingress packets or related data to one or more physical ports of the switching fabric emulator, e.g., for analysis or purposes by a receiving entity. In this example, the switching fabric emulator may be configured to add drop location indicators to the drop packets or related data such that a receiving entity (e.g., a packet analyzer) can identify the emulated packet queue or the emulated packet switch from which each drop occurs. Continuing with this example, the receiving entity can use drop location indicators (DLIs) (e.g., as virtual local area network (VLAN) IDs or other field values) and can generate a report to indicate where packet drops are occurring in the emulated switching fabric or other information.

By capturing dropped packet data in an emulated switching fabric, an example test system can benefit from various advantages including, but not limited to, enabling a test system or an analyzer thereof to analyze and/or identify congestion issues in an emulated switching fabric of a test environment. For example, a test system or a related test controller can send configuration information to a switching fabric emulator (e.g., a device or platform comprising an ASIC or P4 switching chip that can subdivide or allocate physical resources to implement or provide emulated switching elements) for providing an emulated switching fabric. In this example, the switching fabric emulator may be configured to detect when ingress packets (e.g., from a SUT or traffic generator) are dropped (or would be dropped) in the emulated switching fabric. Continuing with this example, the switching fabric emulator may be configured to forward dropped packets or related data (e.g., encapsulated packets comprising dropped packet information and drop location indicators (DPI) indicating at which emulated switch or packet queue the drop occurred) to an analyzer for analyzing drop locations, drop patterns, SUT performance, or other issues.

It will be appreciated that some aspects of the subject matter described herein may be utilized for various test environments including embodiments that involve emulated switching fabric elements (e.g., data center switches), as well as embodiments that utilize real/physical switching fabric elements. It will be appreciated that other embodiments not shown herein may include test scenarios that involve a combination of both emulated and real or physical data center architectures.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
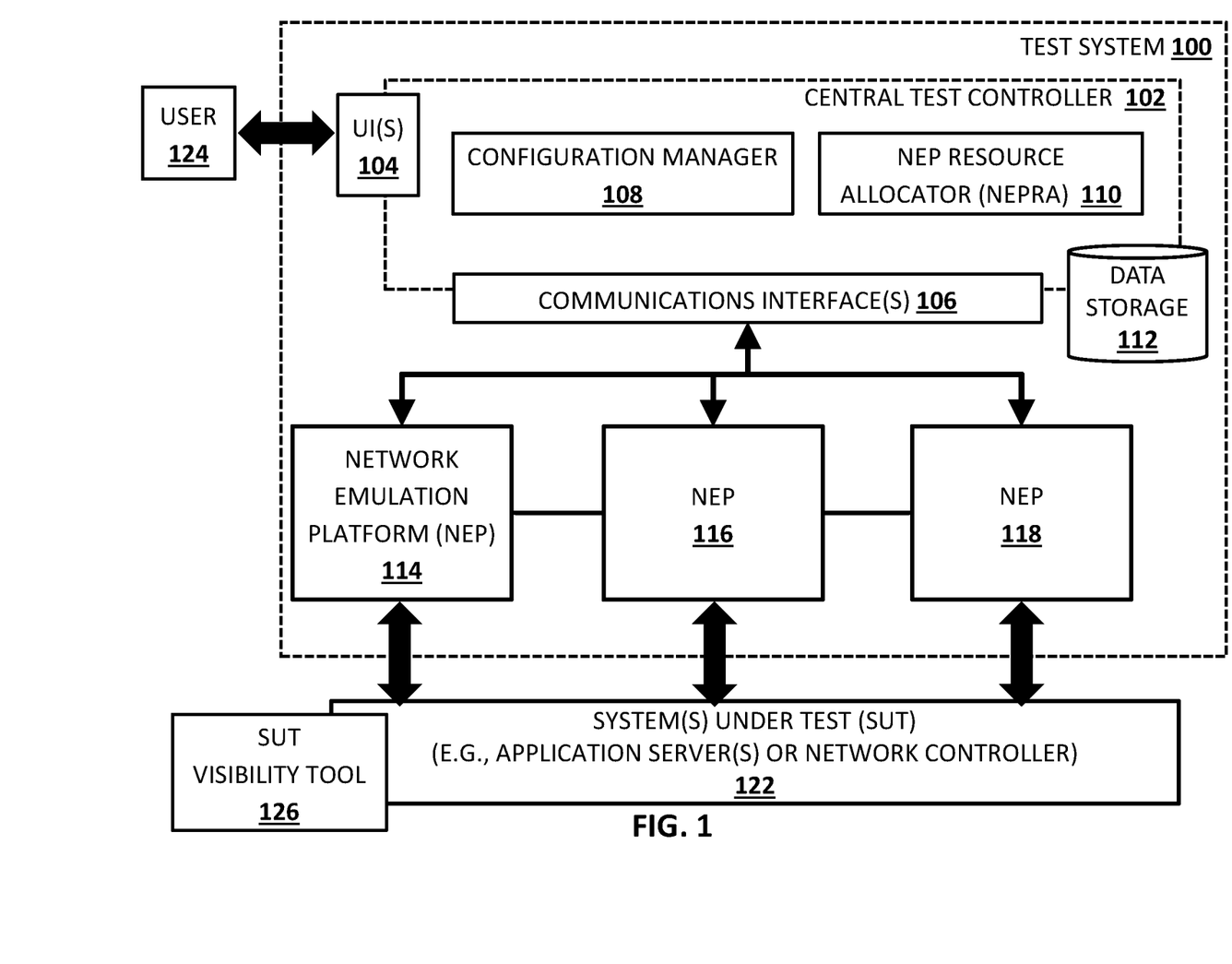
FIG. 1 is a diagram illustrating an example test system for network testing.

FIG. 1 is a diagram illustrating an example test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, for configuring an emulated switching fabric to capture and provide dropped packet data to an analyzer, and/or for analyzing one or more test results, dropped packet data, and/or performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s).

In some embodiments, test system 100 may include one or more modules for performing various test related functions. For example, test system 100 may include a traffic engine or traffic generator for generating test traffic and/or may include various testing related applications or devices (e.g., a test analyzer or test configuration manager) for testing SUT 122. In this example, test system 100 may also include a central test controller (CTC) 102 for triggering and/or managing one or more test sessions associated with one or more NEPs 114-118 or a related emulated environment.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, etc. In this example, high-level or user-definable data models may be converted into lower-level data models or into computer readable instructions for implementing an emulated switching fabric environment using the user-definable data models and resources in one or more of NEPs 114-118.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partition. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

SUT visibility tool 126 may be any suitable entity or entities (e.g., software executing on a processor, an ASIC, an FPGA, or a combination of software, an ASIC, or an FPGA) for monitoring, obtaining, and/or providing SUT performance or related visibility information (e.g., using virtual or physical probes or network taps). For example, SUT visibility tool 126 may include an application programming interface (API) based server or interface that provides collected SUT performance metrics or other related information to test system 100, CTC 102, packet analyzers, visibility modules, or other entities. In this example, SUT visibility tool 126 may obtain various SUT performance related data from one or more visibility related devices, applications, or nodes within or around SUT 122. Continuing with this example, SUT visibility tool 126 may generate performance reports or test analysis reports associated with SUT 122 and may send the reports to test system 100 or entities therein for analysis or other purposes. In another example, SUT visibility tool 126 may be a system with one or more processors (e.g., central processor units (CPUs)) for capturing packets and/or analyzing traffic or related performance, e.g., offline (e.g., after testing session) or online (e.g., during testing session).

Test system 100 may include CTC 102 and multiple NEPs, e.g., NEPs 114-118. CTC 102 may be any suitable entity or entities (e.g., software executing on a processor, a field-programmable gateway array (FPGA), and/or an ASIC, or a combination of software, an FPGA, and/or an ASIC) for performing one or more aspects associated with configuring a test environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated switching fabric environment via one or more UI(s) 104 and may use the user input for configuring NEPs 114-118 or other test system entities for the testing scenario. In this example, CTC 102 may send sets of configuration instructions to various modules or entities, e.g., one or more NEPs 114-118 for setting up or configuring an emulated switching fabric environment.

In some embodiments, CTC 102 may include a configuration manager (CM) 108. CM 108 may be any suitable entity or entities (e.g., software executing on a processor, an FPGA, and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated switching fabric environment performance information. In this example, user 124 may communicate with an API server or other test system entity via an external API that is implemented using a remote procedure call (RPC) protocol.

In some embodiments, CM 108 (or a related API server or gateway) may provide access to several test related services (e.g., traffic generation, visibility and switching fabric emulation, chassis resource, test session generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114-118 or related resources are available for use in a test session; and/or provide test session definitions and associated configuration parameters.

In some embodiments, CTC 102, CM 108, and/or related entities may include or utilize one or more UI(s) 104 for receiving settings and/or configuration information for setting up a testing scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a REST API, an RPC API (e.g., a gRPC API), a command line interface (CLI), a machine-to-machine (M2M) automation interface, and/or a web based GUI.

In some embodiments, UI(s) 104 may include or utilize a GUI or other user interface for selecting and/or configuring emulated switching fabric environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated switching fabric environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114-118 or other entities associated with a test session or test system 100.

In some embodiments, CTC 102, CM 108, and/or related entities may include or utilize software (e.g., a distributed control and orchestration layer or a related API) that provides one or more interfaces for communicating with various test system entities (e.g., emulated and physical switches) for providing monitoring rules and/or related forwarding and/or routing rules of an emulated switching fabric environment.

In some embodiments, CTC 102, CM 108, and/or related entities may configure one or more of NEPs 114-118 to act as a switching fabric emulator. In such embodiments, the switching fabric emulator may be configured to provide emulated switches and emulated queues, e.g., by allocating a subset of resources from underlying ASIC or programmable chips to implement each emulated switch and packet queue.

In some embodiments, a switching fabric emulator (e.g., one or more of NEPs 114-118) may be configured to detect dropped packets (e.g., by checking whether a relevant emulated packet queue has space to receive an ingress packet or by checking whether a packet is associated with a blackhole or null route) and to forward dropped packets or related data (e.g., packet/flow identifier(s), timestamps, and/or metadata associated with one or more dropped packets) to a packet analyzer or another entity (e.g., via a physical or virtual port). In such embodiments, the packets or related data may be encapsulated (e.g., using VLAN encapsulation) and a DLI may be added (e.g., as a VLAN ID) to the encapsulated packets.

In some embodiments, e.g., during or after a test session, a packet analyzer or other entity may receive and use dropped packet information for various purposes, e.g., generating reports and/or visualizations. For example, after receiving dropped packet information from a switch fabric emulator or related entity, a packet analyzer may use the information in generating a visual map or a report indicating packet drop locations (e.g., emulated switches or related packet queues) in an emulated switching fabric.

In some embodiments, CTC 102, CM 108, and/or related entities may include or interact with one or more analysis and/or visibility modules (e.g., SUT visibility tool 126 and/or NEP visibility modules) for obtaining and processing performance metrics or related information (e.g., external or internal event data). In some embodiments, obtained performance metrics or related information may be used in dynamically adjusting an amount of test traffic (e.g., background test packets) in an emulated switching fabric or a particular fabric entity and/or adjusting or maintaining a queue depth (e.g., an egress packet queue) at one or more fabric entities (e.g., an emulated or real network switch).

In some embodiments, CTC 102, CM 108, and/or related entities may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114-118 or other test system entities and may be effectively hidden from user 124.

In some embodiments, NEPRA 110 may allocate and manage resources of NEPs 114-118 for emulated switches without requiring a custom ASIC or hardware pipeline. In some embodiments, NEPRA 110 can be external or internal to CM 108.

In some embodiments, NEPRA 110 may include a resource allocator function configured for accessing user-specified switching fabrication emulation requirements or specification information and NEP resource information (e.g., user input and/or predefined knowledge) and to effectively translate the user's declared data center switching fabric emulation specification into a mapping of NEP resources and associated physical resource allocations, e.g., ASIC switch resources in one or more of NEPs 114-118).

For example, after user 124 specifies a switching fabric environment to be emulated (e.g., based on a library of pre-defined switching fabric environments) and specifies that only NEPs 114 and 116 are available for use in emulating the target data center topology, NEPRA 110 (or a related resource allocator function) may access a NEP resource information database and generate a physical switch resource allocation map that is applied to the switches (e.g., ASICs, SoCs, etc.) contained in NEPs 114 and 116. In this example, the generated physical switch resource allocation map may effectively enable the switch resources in NEPs 114 and 116 to emulate the user-specified target data center topology.

Continuing with the above example, if user 124 subsequently selects NEP 118 to be added to the emulated switching fabric environment, NEPRA 110 or a related entity (e.g., a resource allocator function) may generate a new or updated physical switch resource allocation map that is applied to the switches contained in NEPs 114-118, where the updated physical switch resource allocation map may effectively enables the switch resources in NEPs 114-118 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114-118. In this example, e.g., for NEP 114, logical to physical adaptor 212 may translate information about logical resources into information physical resources of a switch (e.g., a Tomahawk 3 series switch) and vice versa so that interacting nodes may remain unaware of the underlying switch(es) or related switch resources. Continuing with this example, e.g., for NEP 116, logical to physical adaptor 212 may translate information about logical resources into information physical resources of a different type of switch (e.g., a Tomahawk 4 series switch) and vice versa so that interacting nodes may remain unaware of the underlying switch(es) or related switch resources.

In some embodiments, NEPRA 110 may act as an orchestrator and reside between a device interface and interacting entities, e.g., SUT 122, testing applications in NEPs 114-118, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114-118) in order to obtain and/or synthesize the relevant emulated switching fabric performance information. In this example, the emulated switching fabric performance information may be accessible to user 124 via one or more APIs or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more APIs or UI(s) 104.

In some embodiments, test system 100 or entities thereof (e.g., CTC 102 and/or NEPRA 110) may utilize communications interface(s) 106 for interacting with various entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114-118. In another example, communications interface(s) 106 (e.g., via physical or virtual links) may allow CTC 102 or other entities to receive test results or feedback from SUT visibility tool 126, NEP visibility tools, or other entities.

Each of NEPs 114-118 may include hardware and software usable for network emulation and/or switching fabric emulation. For example, each of NEPs 114-118 may be a distinct or separate chassis comprising an implementation of a particular switch processor (e.g., a switching ASIC, a system on a chip (SoC), custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114-118 may be interconnected via various communication ports or links, e.g., 10 gigabit (10G) links, 25 gigabit (25G) links, 40 gigabit (40G) links, 100 gigabit (100G) links, etc.

In some embodiments, test system 100 or entities thereof (e.g., CTC 102, testing applications, and/or NEPRA 110) may include functionality for accessing data storage 112.

Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test sessions, test session data, topology information for emulated switching fabric environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of CTC 102, CM 108, and NEPRA 110.

Figure 2:
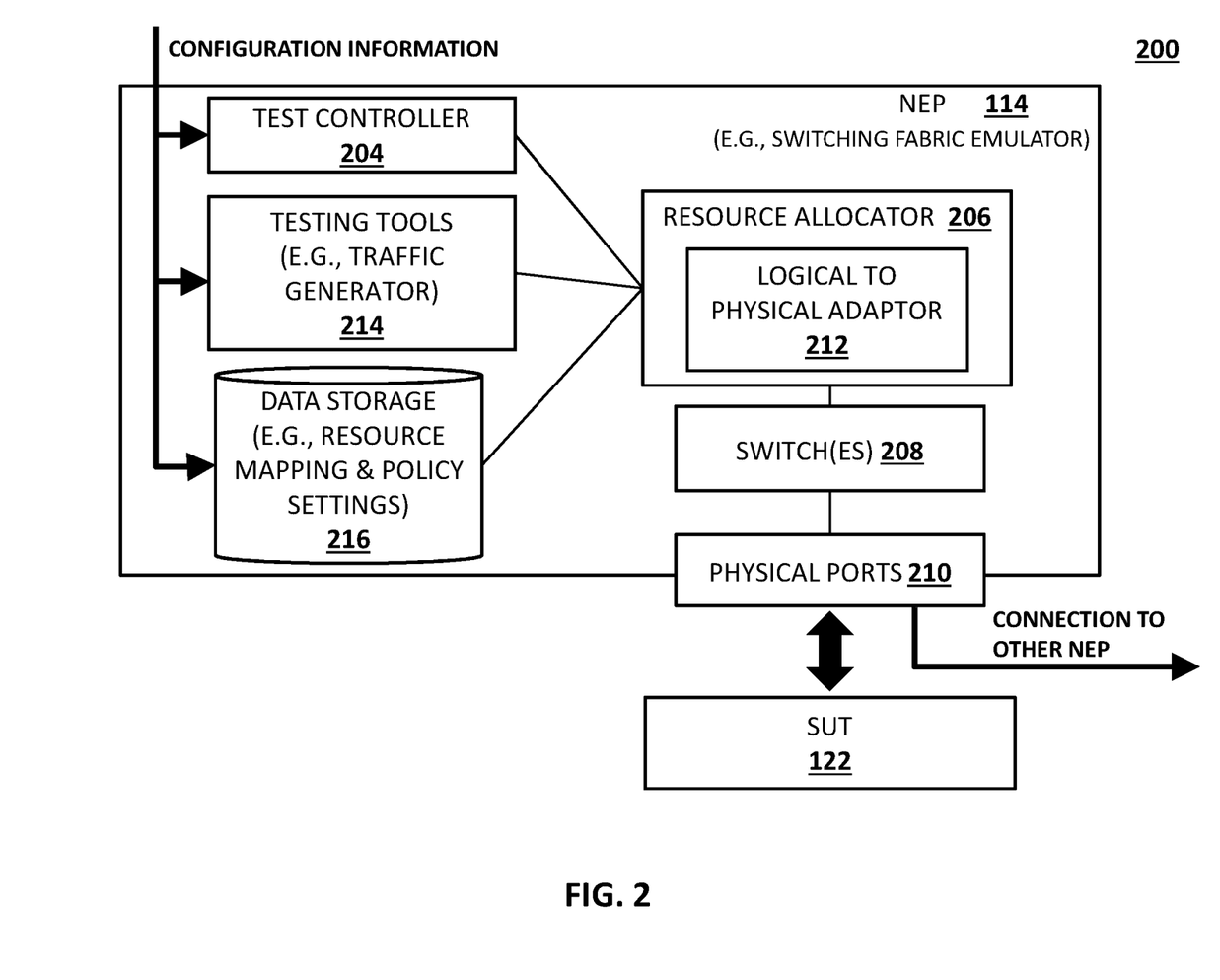
FIG. 2 is a diagram illustrating an example network emulation platform for emulating a switching fabric.

FIG. 2 is a diagram illustrating example aspects of NEP 114. In some embodiments, NEP 114 may include a stand-alone tool, a testing device, a network equipment test device or platform, or software executing on one or more processor(s). In some embodiments, NEP 114 may be a single device or node (e.g., a chassis) and may include one or more modules for emulating a data center or a switching fabric environment and/or may include one or more modules for performing various test related functions associated with the emulated switching fabric environment.

In some embodiments, NEP 114 may be configured to interact with and/or to be configured by CTC 102 or related entities (e.g., CM 108 and/or NEPRA 110). For example, NEP 114, along with other NEPs, may receive particular configuration information from CTC 102 or a related entity via an internal test API. In this example, the configuration information received by NEP 114 may include configuration instructions for configuring NEP 114 or resources therein for use in a testing scenario, e.g., involving one or more test sessions. In another example, the configuration information received by NEP 114 may include test related emulation requirements that are used by NEP 114 or entities therein in generating corresponding or compliant commands or instructions for configuring NEP 114 or resources therein.

NEP 114 may include a test controller (TC) 204, resource allocator (RA) 206, switch(es) 208, ports 210, testing tools 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 114 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 114, e.g., testing tools 214 for controlling (e.g., to pause, (re)start, or stop) a test session.

In some embodiments, TC 204 may utilize out-of-band and/or in-band ports and/or interfaces for communicating with entities of NEP 114 or test system 100, e.g., CTC 102. For example, in embodiments where TC 204 is external to RA 206, TC 204 may communicate with RA 206 via a management port or related interface.

In some embodiments, TC 204 may interact with one or more testing tools 214. Testing tools 214 may represent software or hardware for testing SUT 122 and/or for performing various test related functions, e.g., performance monitoring, test traffic generation, and test analysis. In some embodiments, testing tools 214 can include, but are not limited to, visibility modules (e.g., packet analyzers), traffic generators, SDN controller applications, GUI and CLI applications, and/or test traffic generation applications for communicating with SUT 122 and/or emulation related tools.

In some embodiments, NEP 114 or aspects thereof may be controlled or defined using one or more user-definable data models. For example, CTC 102 may provide a GUI for allowing user 124 to configure or modify a SARA model, a switching fabric model, a switching fabric topology model, a traffic generator model, a network visibility model, etc. used in a testing scenario or a related emulated switching fabric environment. In this example, CTC 102 may send, to TC 204, high-level or user-definable data models indicating a switching fabric topology comprising one or more emulated switches and/or may indicate particular physical resources to allocate to each emulated switch. Continuing with this example, TC 204 or RA 206 may convert these data models into lower-level data models or related computer readable instructions for implementing an emulated switching fabric environment in accordance with the user-definable data models.

In some embodiments, testing tools 214 may include or utilize settings and/or configuration information from CTC 102 or another source for setting up a data center related testing scenario or a related test session. For example, received settings and/or configuration information may be usable for generating and sending test traffic (e.g., background test traffic) that is different from or similar to traffic sent by SUT 122 during a test session. In another example, received settings and/or configuration information may be usable for instructing visibility infrastructure components for monitoring traffic and/or performance aspects associated with a testing scenario or a related emulated switching fabric environment.

In some embodiments, testing tools 214 may include or utilize a traffic engine or traffic generator. For example, a traffic generator may generate test traffic that is directed to traverse emulated logical switches or an emulated switching fabric environment. The emulated switching fabric environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated switching fabric environment without being received or transiting SUT 122. For example, user 124 may specify, via CM 108, levels and types of background test traffic that can be generated on some or all of the NEPs associated with a particular testing scenario or session. For example, some or all of this test traffic can be configured to transit the emulated switching fabric environment (but not SUT 122) during the execution of a test session involving SUT 122. In another example, some or all of this test traffic can be configured to transit SUT 122 during execution of a test session.

In some embodiments, testing tools 214 may include or utilize a visibility module and/or a related analyzer. In such embodiments, the visibility module and/or the related analyzer may be configurable by TC 204 for monitoring performance or telemetry information in a particular emulated switching fabric environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated switching fabric environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may act as a packet analyzer and may be configured to receive and analyze encapsulated packets indicating dropped packets and related dropped location indicators (DLIs). For example, a switching fabric emulator (e.g., NEP 114, test system 100, or one or more platform(s) or device(s)) may be configured to generate an emulated data center switching fabric with multiple emulated switches and may configured to detect dropped packets (e.g., when emulated packet queues is full and cannot receive or keep up with ingress packets or when packets match a blackhole route (e.g., a routing table entry that indicates the packet should go nowhere)) and send the dropped packets or related data in an encapsulated packet to a visibility tool port (e.g., a physical or virtual port that is communicatively connected to a visibility module). In this example, each encapsulated packet may utilize a VLAN ID or other header field value to represent or convey a corresponding DLI associated with the dropped packet. Continuing with this example, the visibility module may generate performance reports or test analysis reports (e.g., dropped packet graphs or maps) using the information obtained from the received encapsulated packets.

In some embodiments, a visibility module may act as a TCP incest detector, where dropped packet data and/or other information is utilized to detect and/or visualize TCP incast issues. In such embodiments, the visibility module may receive generate a report or visualization (e.g., for a network or test operator) indicating a traffic makeup, locations of dropped packets, and/or reasons or sources for the TCP incast issue.

A TCP incast issue may involve a catastrophic TCP throughput collapse that occurs as the number of storage servers sending data to a client increases past the ability of an Ethernet switch to buffer packets. One example of a TCP incast event is when a client application in a cluster-based storage environment requests a data block striped across several storage servers, issuing the next data block request only when all servers have responded with their portion. This synchronized request workload can result in packets overfilling the buffers on the client's port on the switch, resulting in many losses. Under severe packet loss, TCP can experience a timeout that lasts a minimum of 200 ms, determined by the TCP minimum retransmission timeout (RTOmin). When a server involved in a synchronized request experiences a timeout, other servers can finish sending their responses, but the client must wait a minimum of 200 ms before receiving the remaining parts of the response, during which the client's link may be completely idle. The resulting throughput seen by the application may be as low as 1-10% of the client's bandwidth capacity, and the per-request latency will be higher than 200 ms.

In some embodiments, a visibility module may be configured for obtaining emulated logical switch performance metric information associated with a test session by polling RA 206 or another test system entity. For example, by polling for logical switch performance metric information associated with a test session, user 124 may observe how the operation of SUT 122 impacts the emulated switching fabric environment during a test run or session. Polling logical switch performance metric information associated with a test session may also be used for observing how conditions (e.g., background test traffic levels) in the emulated switching fabric environment impact the DUT/SUT during a test run or session.

In some embodiments, a visibility module may be configured to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test session) and may report performance data and/or correlated SUT endpoint information to user 124.

Switch(es) 208 may represent one or more switch processors (e.g., a switching ASIC, a system on a chip (SoC), a programming switching chip, a P$ chip, a Tofino chip, custom hardware, an FPGA, a software switch, etc.) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of switch(es) 208 may be managed and/or allocated to provide emulated switches by RA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or RA 206 may configure one or more of ports 210 (e.g., physical connections) for receiving and sending various types of test packets or related data units; such as IP messages, Ethernet messages, packet data units (PDUs), datagrams, user datagram protocol (UDP) messages, transmission control protocol (TCP) messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, RA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

RA 206 may be any suitable entity or entities (e.g., software executing on a processor, an FPGA, an ASIC, or a combination of software, an FPGA, and/or an ASIC) for performing one or more aspects associated with allocating resources to emulated switches and/or managing emulated switches. In some embodiments, RA 206 may allocate and manage resources of switch(es) 208 for providing emulated switches without requiring a custom ASIC pipeline. In some embodiments, RA 206 can be external or internal to switch (es) 208.

In some embodiments, RA 206 may utilize one or more management ports or related interfaces for communicating with a controller or related applications (e.g., CTC 102, TC 204 and/or testing tools 214) and/or for communicating with switch(es) 208. For example, TC 204 or a related application may communicate with RA 206 via an out-of-band management port or related interface. In this example, RA 206 may send instructions or other communications to switch(es) 208 via another management port or related interface.

In some embodiments, RA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via RA 206, testing tools 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, RA 206 and/or logical to physical adaptor 212 may reside between a native device interface and interacting entities (e.g., SUT 122, testing tools 214, or external devices) and may act as a communications proxy or agent using a logical interface. For example, SUT 122 may include a network switch controller that configures switching resources by sending, via a logical interface associated with RA 206, configuration requests for requesting and/or configuring one or more switches. In this example, RA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, RA 206 and/or logical to physical adaptor 212 may translate switch performance results coming from a native switch interface into virtualized results (e.g., link status or counter values for a physical port '60' may be changed to values for a logical port 'v1' on an emulated switch 'TORSW1') before sending the virtualized results to the network switch controller via the logical interface.

In some embodiments, RA 206 and/or logical to physical adaptor 212 may create, store, and/or use switching ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for logical port 'v1', the statistical counters for physical port '60' may be queried.

In some embodiments, RA 206 and/or logical to physical adaptor 212 may utilize a modified proprietary (e.g., vendor) API (e.g., a vendor's software development kit (SDK) or by utilizing a wrapper API that interacts with a vendor API. For example, by using a wrapper API, RA 206 can manage a fleet of emulated switches using off-the-shelf or commodity ASICs with NOSes that utilize a proprietary or vendor API.

In some embodiments, RA 206 and/or logical to physical adaptor 212 may utilize a custom adaptor that handles certain applications or functions which may involve a subset of resource management and mapping requirements than a standard switching API. For example, by using a custom adaptor, RA 206 can manage a fleet of emulated switches for certain use cases using off-the-shelf or commodity ASICs.

In some embodiments, NEP 114 or entities thereof (e.g., TC 204, testing tools 214, and/or RA 206) may include functionality for accessing data storage 216. Data storage 216 may be any suitable entity or entities (e.g., a storage device, a non-transitory computer readable medium, or a storage system) for maintaining or storing information related to switching ASIC emulation, network testing, or related test analysis. For example, data storage 216 may include switching ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test sessions, test session data, topology information for emulated switching fabric environments, information usable for generating performance metrics (e.g., statistics) associated with one or more aspects of SUT 122, and/or other information associated with testing SUT 122. In some embodiments, data storage 216 may be located at NEP 114, another node, or distributed across multiple platforms or devices.

It will be appreciated that FIG. 3 is for illustrative purposes and that various depicted entities, their locations, and/or their functions described above in relation to FIG. 3 may be changed, altered, added, or removed. For example, NEP 114 may include a chassis or rack including one or more computers (e.g., blade computers) each including at least one processor coupled to a memory, e.g., data storage 216. In this example, each server may include functionality of TC 204, RA 206, and/or testing tools 214.

Figure 3:
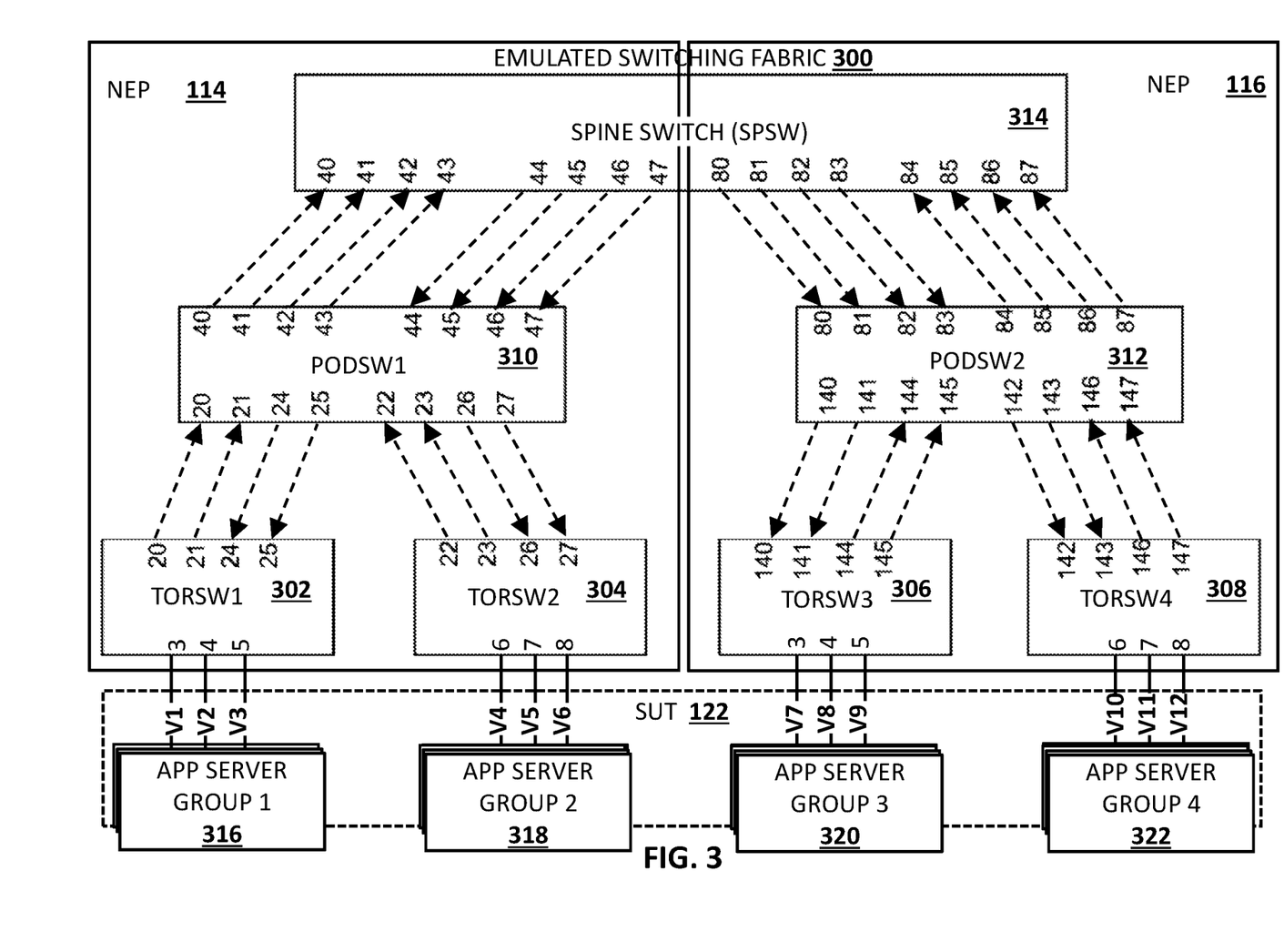
FIG. 3 is a diagram illustrating an example emulated switching fabric usable for network testing.

FIG. 3 is a diagram illustrating an example emulated switching fabric 300 usable for network testing. Emulated switching fabric 300 may represent a switching fabric comprising a network of emulated switches for forwarding packets from or to SUT 122 or other entities, where the emulated switches may be connected via a particular (e.g., user-defined) logical topology. For example, emulated switching fabric 300 may be implemented using resources (e.g., switches 208) of NEPs 114 and 116 and configured based on user input and/or predetermined environment templates or data models, e.g., stored in data storage 216.

In some embodiments, e.g., where emulated switching fabric 300 uses multiple NEPs (e.g., NEPs 114 and 116), physical connections or links may be used for communicatively connecting NEPs or physical resources therein. For example, each of NEPs 114-118 may use one or more of its physical ports 210 for interconnecting or linking with other NEPs, e.g., via 40G or 100G links. In another example, each of NEPs 114-118 may be communicatively connected via wireless transceivers.

Referring to FIG. 3, emulated switching fabric 300 may represent a 3-stage Clos switching network comprising different stages of emulated switches, wherein each emulated switch is implemented using physical resources of NEP 114 and/or 116. As depicted, stage one switches of emulated switching fabric 300 include top of rack switches (TORSWs) 302 and 304 implemented using NEP 114 and TORSWs 306 and 308 implemented using NEP 116. Stage two switches of emulated switching fabric 300 include cluster or pod switch (PODSW) 310 implemented using NEP 114 and PODSW 312 implemented using NEP 116. Stage three of emulated switching fabric 300 include a spine switch (SPSW) 314 implemented using both NEP 114 and 116. In some embodiments, TORSWs 302-308 may represent or emulate switches that are connected to multiple servers (e.g., located within a rack or nearby rack), POD-SWs 310-312 may each represent or emulate an aggregation switch that is connected to multiple TORSWs, and SPSW 314 may represent or emulate a higher-level aggregation switch that is connected to multiple PODSWs.

In some embodiments, characteristics (e.g., bandwidth, supported protocols, or processing speed or throughput) of emulated switches may be varied as defined by test configuration information or related settings. For example, each of NEPs 114 and 116 may include a different brand, type, and/or version of switches 208 and/or other hardware. In this example, depending on user input and/or configuration information, NEPRA 110 may indicate which NEP is to emulate which emulated switches based on NEP capabilities and user requirements for emulated switching fabric 300.

In some embodiments, some physical ports of switch(es) 208 of NEPs 114 and 116 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322, each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a distinct set of physical ports 210 of switch(es) 208 in NEP 114 or NEP 116, where each set of physical ports 210 is assigned or allocated to a particular emulated switch. For example, RA 206 of a respective NEP may assign physical ports '60', '61', and 62' to an emulated switch 'TORSW1' and may virtualize those physical ports as 'v1', 'v2', and 'v3', respectively. In this example, applications and/or servers in application server group 1 316 may be communicatively coupled to one or more of the logical ports of the emulated switch 'TORSW1'.

In some embodiments, configuration information may include any suitable information for mapping logical ports associated with emulated switching fabric 300 to physical ports of switch(es) 208 in one of NEPs 114-118. In some embodiments, configuration information may be stored or maintained in data storage 216 and may be usable for translating port information or related information in switch configuration commands, performance metrics, and/or other communications.

It will be appreciated that FIG. 3 is for illustrative purposes and that various depicted entities, their locations, and/or their functions described above in relation to FIG. 3 may be changed, altered, added, or removed.

Figure 4:
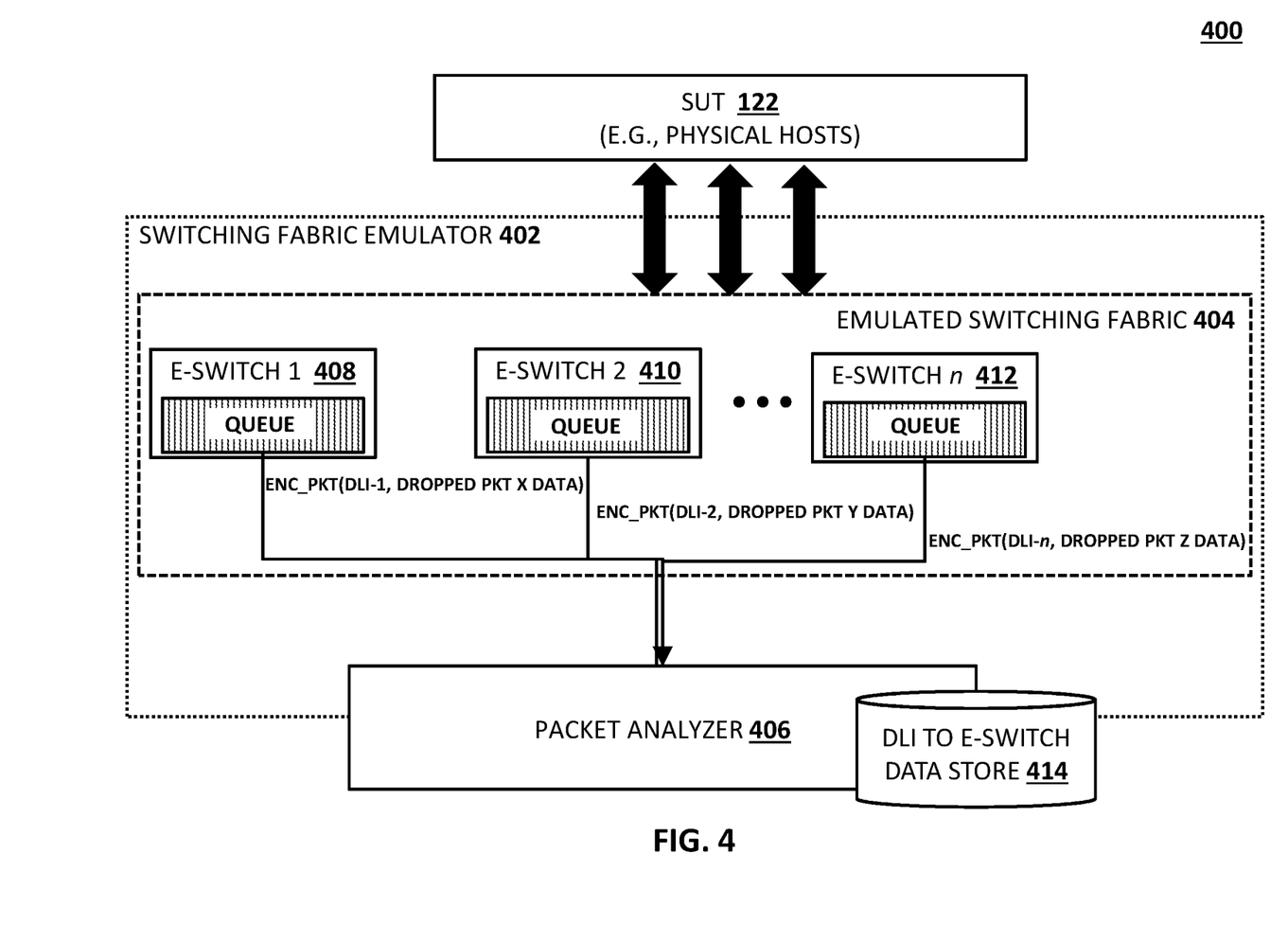
FIG. 4 is a diagram illustrating an example test environment for capturing dropped packet data.

FIG. 4 is a diagram illustrating an example test environment 400 for capturing dropped packet data. Test environment 400 may include a switching fabric emulator 402 providing an emulated switching fabric 404 comprising emulated switches (e-switches) 408-412, SUT 122 (e.g., physical hosts, storage servers, web servers, etc.) connected to switching fabric emulator 402 and adapted to communicate packets via emulated switching fabric 404, and a packet analyzer 406 for receiving dropped packet data and/or other information (e.g., test performance metrics) for analysis.

In some embodiments, switching fabric emulator 402 may include or comprise test system 100, one or more NEPs 114-118, or related functionality. For example, switching fabric emulator 402 may include or interact with a CTC 102 or CM 108 for receiving configuration information for setting up and configuring emulated switching fabric 404. In this example, the configuration information may instruct NEPRA 110 in virtualizing physical switching resource(s) for emulating e-switches 408-412 and related emulated packet queues (e.g., buffers) for testing SUT 122. In this example, each of e-switches 408-412 may be allocated a portion of resources associated with a physical switching chip (e.g., an ASIC switching chip or a programmable switching chip) of switching fabric emulator 402 and each emulated packet queue associated with one of e-switches 408-412 may be allocated a portion of a physical queue or buffer of the physical switching chip.

In some embodiments, e.g., in lieu of using an ASIC or physical switching chip, switching fabric emulator 402 and/or related functionality may be implemented in software on processors. For example, switching fabric emulator 402 may be implemented as a virtual container and may distributed among multiple processors or devices. In this example, switching fabric emulator 402 may provide vSwitches and/or various virtualized switching fabric elements.

In some embodiments, emulated switching fabric 404 may involve allocating (e.g., statically, semi-statically, or dynamically) to an emulated switch a subset of "front-panel" traffic ports of switching fabric emulator 402 for links (e.g., physical cables) to SUT 122 (e.g., servers or hosts that utilize switching fabric services) and other devices or platforms (e.g., additional NEPs 116 and 118).

In some embodiments, external cables may not be required to link emulated switches because internal loopback interfaces can obviate the need for external cabling within switching fabric emulator 402 (e.g., NEP 114). In some embodiments, external cables may be used to connect emulated switches because the emulated switches may utilize resources from multiple or different NEPs (e.g., NEPs 114-118).

In some embodiments, switching fabric emulator 402 may be configured to selectively copy or mirror packets or related data that are dropped from queues of e-switches 408-412 of emulated switching fabric 402. It will be appreciated that such packets may be dropped for any reason including but not limited to blackhole routes or overflowing or filled queues. For example, switching fabric emulator 402 or a related entity may determine whether an emulated queue associated with e-switch 408 has space to add or buffer an packet and, if not, may deem the packet a dropped packet and then send the dropped packet or related data (e.g., information identifying the packet or other data) to packet analyzer 410 or another entity. In another example, switching fabric emulator 402 or a related entity may determine whether an ingress packet is associated with a blackhole or null route (e.g., a routing table entry indicating that matching packets are to go nowhere) and, if so, may deem the packet a dropped packet and then send the dropped packet or related data (e.g., information identifying the packet or other data) to packet analyzer 410 or another entity.

In some embodiments, e.g., instead of discarding dropped packets, switching fabric emulator 402 or a related entity may be configured to encapsulate dropped packets or related data. For example, switching fabric emulator 402 or a related entity may encapsulate at least a portion of a dropped packet within an encapsulation packet, such as a VLAN packet or 802.1 Q packet. In this example, the encapsulating VLAN header and/or trailer portions may include information (e.g., a DLI as a VLAN ID) that can be used (e.g., by test system 100, packet analyzer 406, or another entity) to identify the emulated switch or related queue from which the packet was dropped.

It will be appreciated that the present invention is not limited to the use of VLAN as the encapsulation protocol, various other encapsulation protocol or technology, such as virtual extensible local area network (VXLAN) encapsulation or another encapsulation technology.

In some embodiments, packet analyzer 406 may include a visibility module or related functionality. For example, packet analyzer 406 may be software-based and/or co-located at switching fabric emulator 402. In another example, packet analyzer 406 may be a device separate from switching fabric emulator 402.

In some embodiments, packet analyzer 406 may be configurable by test system 100 or related entities. For example, prior to test session, packet analyzer 406 may receive configuration information for instructing packet analyzer 406 on decapsulating and/or analyzing dropped packet data. In this example, the configuration information may include mapping data indicating associations between DLIs (e.g., VLAN IDs or other field values) and corresponding emulated switching fabric elements (e.g., e-switches 408-412 or related queues). Continuing with this example, the mapping data may be stored in an accessible data store, e.g., a DLI to e-switch data store 414.

In some embodiments, packet analyzer 406 may be configured to receive and analyze encapsulated packets indicating dropped packets and related DLIs. For example, each encapsulated packet may utilize a VLAN ID or other header field value to represent or convey a corresponding DLI associated with the dropped packet. Continuing with this example, packet analyzer 406 may generate performance reports or test analysis reports (e.g., a dropped packet graph or map indicating the total number of drops at each of e-switches 408-412 for a given test session or observation period) using the information obtained from the received encapsulated packets.

In some embodiments, packet analyzer 406 may include a TCP incast detector, where dropped packet data and/or other information is utilized to detect and/or visualize TCP incast issues. In such embodiments, the visibility module may receive generate a report or visualization (e.g., for a network or test operator) indicating a traffic makeup, locations of dropped packets, and/or reasons or sources for the TCP incast issue. For example, packet analyzer 406 may be configured to receive fabric metrics and metadata (e.g., queue depth, latency, etc.) from switching fabric emulator 402 and/or other entities. In this example, packet analyzer 406 may be configured to receive dropped packets or related portions, e.g., in encapsulated packets that convey DLIs or related information. Continuing with this example, packet analyzer 406 may utilize mapping data (e.g., from data store 414) to identify drop locations when detecting and/or visualizing incast phenomena that occur during a test session or an observation period.

It will be appreciated that FIG. 4 is for illustrative purposes and that various depicted entities, their locations, and/or their functions described above in relation to FIG. 4 may be changed, altered, added, or removed.

Figure 5:
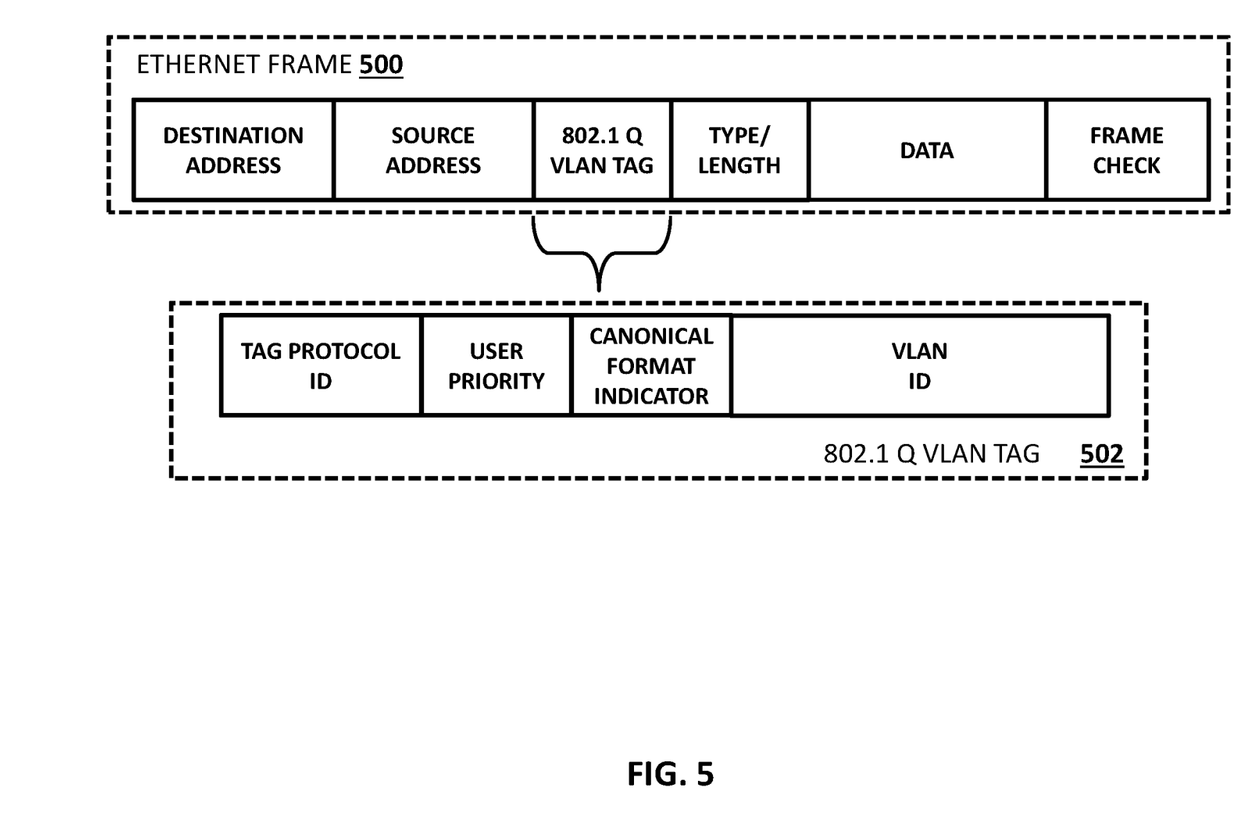
FIG. 5 is a diagram illustrating example packet data.

FIG. 5 is a diagram illustrating example packet data, particularly an Ethernet frame 500 and a 802.1 Q VLAN tag 502. As depicted in FIG. 5, ethernet frame 500 may represent an Ethernet frame depicting various fields or portions, including a destination address field, a source address field, an 802.1 Q VLAN tag field, a type and/or length field, a data or payload field, and a frame check field. In some embodiments, the data field of Ethernet may store a second Ethernet frame, an IP packet or other data unit (e.g., a TCP or UDP packet) or data from a frame, packet, or data unit. For example, switching fabric emulator 402 (e.g., one or more of NEPs 114-118) or other entities (e.g., a NIC) may be configured to encapsulate dropped packets or data therefrom (e.g., an IP tuple or packet identifier and, optionally, a timestamp) in an Ethernet frame.

802.1 Q VLAN tag 502 represents a portion of Ethernet frame 500 comprising 802.1 Q VLAN tag information, including a tag protocol ID field, a user priority field, a canonical format indicator field, and a VLAN ID field. In some embodiments, a VLAN ID field value and/or other portions of 802.1 Q VLAN tag 502 may be capable of providing or representing a DLI for corresponding packet (e.g., a dropped packet or related data stored in the data field of Ethernet frame 500. For example, switching fabric emulator 402 (e.g., one or more of NEPs 114-118) or other entities (e.g., a NIC) may be configured to determine or generate a DLI for a dropped packet and include the DLI (e.g., as part of 802.1 Q VLAN tag) in a corresponding encapsulated packet (e.g., Ethernet frame 500). In this example, switching fabric emulator 402 or other entities may be configured to determine (e.g., using predetermined configuration information or mappings) how to represent or convey a DLI using a VLAN ID or another field value (e.g., each emulated switch may be assigned a unique VLAN ID prior to a test session).

It will be appreciated that FIG. 5 is for illustrative purposes and that various aspects described above in relation to FIG. 5 may be changed, altered, added, or removed.

Figure 6:
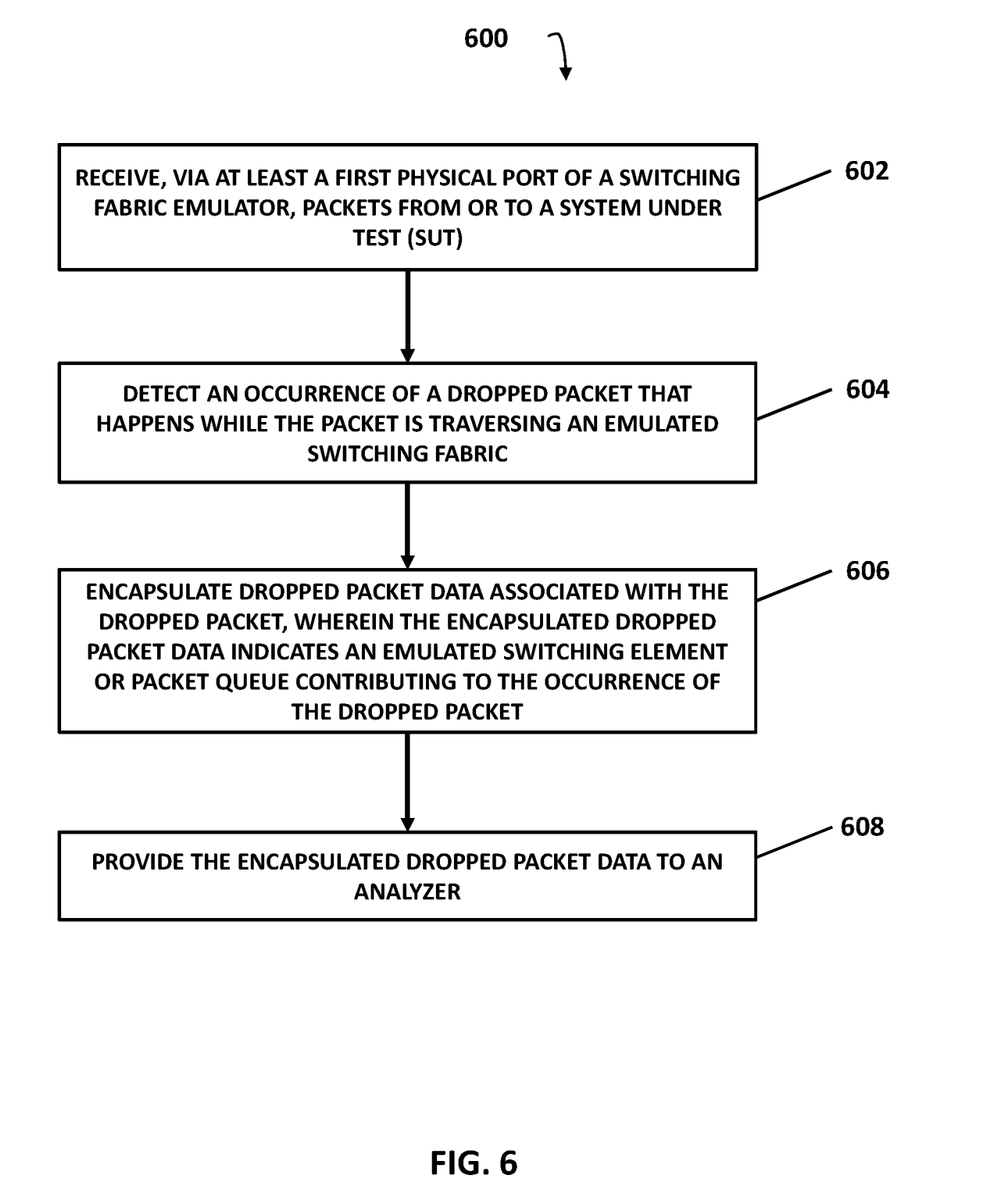
FIG. 6 is a diagram illustrating an example process for capturing dropped packets at a switching fabric emulator.

FIG. 6 is a diagram illustrating an example process 600 for capturing dropped packets at switching fabric emulator 402. In some embodiments, process 600, or portions thereof, may be performed by or at test system 100, CTC 102, CM 108, NEPRA 110, one or more of NEPs 114-118, testing tools 214, packet analyzer 406, and/or another node or module. In some embodiments, process 600 may include steps 602, 604, 606, and 608. In some embodiments, process 600 may occur during or concurrently with a test session implemented or facilitated by test system 100 or other entities.

Referring to process 600, in step 602, packets from or to a SUT (e.g., SUT 122) may be received via at least a first physical port (e.g., physical ports 210) of a switching fabric emulator (e.g., NEP 114). For example, a traffic engine (e.g., traffic generator) may generate and send test packets to SUT 122 via emulated switching fabric 404 provided by switching fabric emulator 402 (e.g., NEP 114). In another example, SUT 122 may send packets to one or more destinations via emulated switching fabric 404.

In step 604, an occurrence of a dropped packet (e.g., a packet that drops while traversing an emulated switching fabric provided by switching fabric emulator 402) may be detected.

In some embodiments, switching fabric emulator 402 may be configured to forward dropped packets or related data (e.g., an encapsulated packet containing data from one or more dropped packets) to an analyzer (e.g., packet analyzer 406) via one or more physical ports (e.g., front panel ports) or virtual ports of switching fabric emulator 402. For example, switching fabric emulator 402 (e.g., one or more of NEPs 114-118) may be configured (e.g., by CTC 102) to provide multiple emulated switches and related emulated queues by allocating physical resources of an ASIC or a P4 switching chip and may also be configured to detect when an ingress packet will be dropped (e.g., by determining when an emulated queue associated with an emulated switch cannot receive the ingress packet) and may forward the dropped packet or related data (e.g., packet header information and/or packet payload information) to an analyzer or a port of switching fabric emulator 402.

In step 606, dropped packet data associated with the dropped packet may be encapsulated (e.g., using VLAN or VXLAN encapsulation), where the encapsulated dropped packet data may indicate an emulated switching element or packet queue contributing to or causing the occurrence of the dropped packet. For example, switching fabric emulator 402 or a related entity may be configured to encapsulate each dropped packet or related packet data using an encapsulation protocol or technology, where the encapsulated packet may include a DLI (e.g., a VLAN ID or another parameter value) indicating the emulated switch or emulated queue from which the drop occurs (or would occur).

In some embodiments, encapsulating dropped packet data may include using VLAN encapsulation, VXLAN encapsulation, or another encapsulation technology.

In step 608, the encapsulated dropped packet data may be provided to an analyzer (e.g., packet analyzer 406).

In some embodiments, an analyzer may include a TCP incast detector for detecting or visualizing incast events that occur during a test session or portion thereof.

In some embodiments, an analyzer (e.g., packet analyzer 406) may be configured for receiving encapsulated dropped packet data; determining, using the encapsulated dropped packet data, a first encapsulated data field value (e.g., a VLAN ID or DLI) indicating an emulated switching element or packet queue contributing to the dropped packet; determining, using the first encapsulated data field value and mappings between encapsulated data field values and emulated switching element identifiers, the emulated switching element or packet queue contributing to the dropped packet; and generating a report or other output indicating that a drop occurred at the emulated switching element or packet queue.

In some embodiments, a first encapsulated data field value may include a VLAN identifier, a VXLAN identifier, a VLAN tag value, or a VXLAN tag value.

In some embodiments, mappings between encapsulated data field values (e.g., DLIs) and emulated switching element identifiers (e-switch IDs) may be provisioned prior to executing a test session. For example, test system 102 or another entity may configure an emulated data center switching fabric comprising 15 emulated switches, where each of the emulated switches is assigned a unique DLI, which can be expressed as a VLAN ID in encapsulated packets. In this example, e.g., prior to initiating a test session, the mappings may be stored in a storage device (e.g., data store 414) accessible by packet analyzer 406 or other entities.

In some embodiments, a report or other output generated by an analyzer (e.g., packet analyzer 406) may include a visualization (e.g., a heat map or an interactive graph) indicating packet drops at the emulated switching elements or the associated packet queues.

In some embodiments, switching fabric emulator 402 (e.g., NEP 114) and an analyzer (e.g., packet analyzer 406) may be configurable by a network test system (e.g., test system 100) or a related network test controller (e.g., CTC 102).

It will be appreciated that process 600 is for illustrative purposes and that different and/or additional actions may be used. It will also be appreciated that various actions described herein may occur in a different order or sequence.

It should be noted that test system 100, CTC 102, CM 108, NEPRA 110, NEPs 114-118, switching fabric emulator 402, packet analyzer 406, and/or functionality described herein may constitute one or more special purpose computing devices. Further, test system 100, CTC 102, CM 108, NEPRA 110, NEPs 114-118, switching fabric emulator 402, packet analyzer 406, and/or functionality described herein can improve the technological field of testing networks and related nodes by providing mechanisms, systems, methods, and/or techniques for capturing dropped packets at switching fabric emulator 402.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for capturing dropped packets at a switching fabric emulator, the method comprising:
at the switching fabric emulator providing an emulated switching fabric comprising emulated switching elements and associated packet queues, wherein the switching fabric emulator comprises at least one switching application-specific integrated circuit (ASIC) or programmable switching chip:
during a test session:
receiving, via at least a first physical port of the switching fabric emulator, packets from or to a system under test (SUT); detecting an occurrence of a dropped packet-in the emulated switching fabric;
encapsulating dropped packet data associated with the dropped packet, wherein the encapsulated dropped packet data indicates an emulated switching element or packet queue contributing to the occurrence of the dropped packet; and
providing the encapsulated dropped packet data to an analyzer; and
at the analyzer:
receiving the encapsulated dropped packet data;
determining, using the encapsulated dropped packet data, a first encapsulated data field value indicating the emulated switching element or packet queue contributing to the dropped packet;
determining, using the first encapsulated data field value and mappings between encapsulated data field values and emulated switching element identifiers, the emulated switching element or packet queue contributing to the dropped packet, wherein the mappings between encapsulated data field values and emulated switching element identifiers are provisioned prior to executing the test session; and
generating a report or other output indicating that a drop occurred at the emulated switching element or packet queue.

2. The method of claim 1 wherein the switching fabric emulator is configured to forward dropped ingress packets or related data to the analyzer via one or more ports of the switching fabric emulator.

3. The method of claim 1 wherein encapsulating the dropped packet data includes using virtual local area network (VLAN) encapsulation, virtual extensible local area network (VXLAN) encapsulation, or another encapsulation technology.

4. The method of claim 1 wherein the first encapsulated data field value includes a virtual local area network (VLAN) identifier, a virtual extensible local area network (VXLAN) identifier, a VLAN tag value, or a VXLAN tag value.

5. The method of claim 1 wherein the report or other output includes a visualization indicating packet drops at the emulated switching elements or the associated packet queues.

6. The method of claim 1 wherein the analyzer includes a transmission control protocol (TCP) incast detector for detecting or visualizing incast events that occur during the test session or portion thereof.

7. The method of claim 1 wherein the switching fabric emulator and the analyzer are configurable by a network test system or a related network test controller.

8. A system for capturing dropped packets at a switching fabric emulator, the system comprising:
an analyzer; and
the switching fabric emulator providing an emulated switching fabric comprising emulated switching elements and associated packet queues comprising:
at least one switching application-specific integrated circuit (ASIC) or programmable switching chip; and
a memory, wherein the switching fabric emulator is configured for:

during a test session:
  receiving, via at least a first physical port of the switching fabric emulator, packets from or to a system under test (SUT);
  detecting an occurrence of a dropped packet in the emulated switching fabric;
  encapsulating dropped packet data associated with the dropped packet, wherein the encapsulated dropped packet data indicates an emulated switching element or packet queue contributing to the occurrence of the dropped packet; and
  providing the encapsulated dropped packet data to the analyzer, and wherein the analyzer is configured for:
  receiving the encapsulated dropped packet data;
  determining, using the encapsulated dropped packet data, a first encapsulated data field value indicating the emulated switching element or packet queue contributing to the dropped packet;
  determining, using the first encapsulated data field value and mappings between encapsulated data field values and emulated switching element identifiers, the emulated switching element or packet queue contributing to the dropped packet, wherein the mappings between encapsulated data field values and emulated switching element identifiers are provisioned prior to executing the test session; and
  generating a report or other output indicating that a drop occurred at the emulated switching element or packet queue.

9. The system of claim 8 wherein the switching fabric emulator is configured to forward dropped ingress packets or related data to the analyzer via the first physical port or another port of the switching fabric emulator.

10. The system of claim 8 wherein encapsulating the dropped packet data includes using virtual local area network (VLAN) encapsulation, virtual extensible local area network (VXLAN) encapsulation, or another encapsulation technology.

11. The system of claim 8 wherein the first encapsulated data field value includes a virtual local area network (VLAN) identifier, a virtual extensible local area network (VXLAN) identifier, a VLAN tag value, or a VXLAN tag value.

12. The system of claim 8 wherein the report or other output includes a visualization indicating packet drops at the emulated switching elements or the associated packet queues.

13. The system of claim 8 wherein the analyzer includes a transmission control protocol (TCP) incast detector for detecting or visualizing incast events that occur during the test session or portion thereof.

14. The system of claim 8 wherein the switching fabric emulator and the analyzer are configurable by a network test system or a related network test controller.

15. The system of claim 8 wherein the at least one ASIC or programmable switching chip includes a P4 programmable chip or a Tofino chip.

16. A non-transitory computer readable medium having stored thereon executable instructions embodied in the non-transitory computer readable medium that when executed by at least one processor of at least one computing device cause the at least one computing device to perform steps comprising:
  at a switching fabric emulator providing an emulated switching fabric comprising emulated switching elements and associated packet queues, wherein the switching fabric emulator comprises at least one switching application-specific integrated circuit (ASIC) or programmable switching chip:
  during a test session:
    receiving, via at least a first physical port of the switching fabric emulator, packets from or to a system under test (SUT);
    detecting an occurrence of a dropped packet in the emulated switching fabric;
    encapsulating dropped packet data associated with the dropped packet, wherein the encapsulated dropped packet data indicates an emulated switching element or packet queue contributing to the occurrence of the dropped packet; and
    providing the encapsulated dropped packet data to an analyzer; and
  at the analyzer:
    receiving the encapsulated dropped packet data;
    determining, using the encapsulated dropped packet data, a first encapsulated data field value indicating the emulated switching element or packet queue contributing to the dropped packet;
    determining, using the first encapsulated data field value and mappings between encapsulated data field values and emulated switching element identifiers, the emulated switching element or packet queue contributing to the dropped packet, wherein the mappings between encapsulated data field values and emulated switching element identifiers are provisioned prior to executing the test session; and
    generating a report or other output indicating that a drop occurred at the emulated switching element or packet queue.

* * * * *